(12) United States Patent
Zhang et al.

(10) Patent No.: US 10,774,815 B2
(45) Date of Patent: Sep. 15, 2020

(54) BLADE DEFLECTION MONITORING SYSTEM

(71) Applicant: LM WP PATENT HOLDING A/S, Kolding (DK)

(72) Inventors: Shuai Zhang, Aalborg (DK); Claus Byskov, Silkeborg (DK); Gert Frølund Pedersen, Storvorde (DK)

(73) Assignee: LM WP PATENT HOLDING A/S, Kolding (DK)

( * ) Notice: Subject to any disclaimer, the term of this patent is extended or adjusted under 35 U.S.C. 154(b) by 142 days.

(21) Appl. No.: 16/078,785

(22) PCT Filed: Feb. 21, 2017

(86) PCT No.: PCT/EP2017/053949
§ 371 (c)(1),
(2) Date: Aug. 22, 2018

(87) PCT Pub. No.: WO2017/144472
PCT Pub. Date: Aug. 31, 2017

(65) Prior Publication Data
US 2019/0055929 A1 Feb. 21, 2019

(30) Foreign Application Priority Data
Feb. 23, 2016 (EP) .................................... 16156966

(51) Int. Cl.
*F03D 17/00* (2016.01)
*F03D 7/02* (2006.01)
(Continued)

(52) U.S. Cl.
CPC ........... *F03D 17/00* (2016.05); *F03D 1/0675* (2013.01); *F03D 7/0224* (2013.01);
(Continued)

(58) Field of Classification Search
CPC ...... F03D 17/00; F03D 7/0296; F03D 7/0224; F03D 1/0675; F03D 13/35; F05B 2270/17;
(Continued)

(56) References Cited

U.S. PATENT DOCUMENTS 420,332 A 5/1889 Carrico
3,959,829 A 6/1976 Nordgren
(Continued)

FOREIGN PATENT DOCUMENTS

DE 102010019014 A1 11/2011
EP 2485011 A1 8/2012
(Continued)

OTHER PUBLICATIONS

The Extended European Search Report dated Aug. 5, 2016 corresponding to application No. 16156966.0-1607.

*Primary Examiner* — Brian P Wolcott
(74) *Attorney, Agent, or Firm* — Nath, Goldberg & Meyer; Jerald L. Meyer; Tanya E. Harkins

(57) ABSTRACT

A wind turbine blade comprising a system for monitoring the deflection of a wind turbine blade is described. The system comprises a wireless range-measurement system, having at least one wireless communication device located towards the root end of the blade and at least one wireless communication device located towards the tip end of the blade, the communication devices comprising antennas polarized substantially perpendicular to the suction side of the blade and substantially parallel to the leading edge of the wind turbine blade.

17 Claims, 12 Drawing Sheets

(51) Int. Cl.
*F03D 1/06* (2006.01)
*F03D 13/35* (2016.01)

(52) U.S. Cl.
CPC ............ *F03D 7/0296* (2013.01); *F03D 13/35* (2016.05); *F05B 2260/70* (2013.01); *F05B 2260/80* (2013.01); *F05B 2270/17* (2013.01); *F05B 2270/821* (2013.01); *F05D 2250/74* (2013.01)

(58) Field of Classification Search
CPC ............ F05B 2270/821; F05B 2250/74; F05B 2260/70; F05B 2260/80
See application file for complete search history.

(56) References Cited

U.S. PATENT DOCUMENTS

| | | |
|---|---|---|
| 4,343,051 A | 8/1982 | Persson |
| 5,303,431 A | 4/1994 | Johansson |
| 6,184,014 B1 | 2/2001 | Echigo |
| 7,209,724 B2* | 4/2007 | Richards ............... H04B 1/7163 455/266 |
| 7,883,316 B2* | 2/2011 | Kildegaard ............. F03D 7/042 416/1 |
| 8,714,912 B2* | 5/2014 | Gierlich .................. F03D 17/00 415/118 |
| 9,000,970 B2* | 4/2015 | Andersen ............... G01B 15/06 342/6 |
| 10,330,082 B2* | 6/2019 | Byskov ................... F03D 17/00 |
| 2011/0150647 A1 | 6/2011 | Gierlich et al. |
| 2012/0035865 A1* | 2/2012 | Fujioka ................... F03D 17/00 702/42 |

FOREIGN PATENT DOCUMENTS

| | | |
|---|---|---|
| EP | 2778602 A1 | 9/2014 |
| WO | 2014027032 A2 | 2/2014 |

* cited by examiner

BLADE DEFLECTION MONITORING SYSTEM

This is a National Phase Application filed under 35 U.S.C. 371 as a national stage of PCT/EP2017/053949, filed Feb. 21, 2017, an application claiming the benefit of European Application No. 16156966.0, filed Feb. 23, 2016, the content of each of which is hereby incorporated by reference in its entirety.

FIELD OF THE INVENTION

The present invention relates to wind turbine blade and a system and method for the monitoring of deflection of a wind turbine blade.

BACKGROUND OF THE INVENTION

Modern wind turbine designs seek to incorporate various blade monitoring systems, in order to provide for reliable and controlled operation of the wind turbine. Such monitoring systems can include blade deflection monitoring systems, which are used to provide an indication of wind turbine blade deflection or flexing during turbine operation. This information can be used to monitor for the risk of a future tower strike by the wind turbine blades, and to perform appropriate controller actions, e.g. blade pitching or turbine braking to minimize or eliminate such risk.

An example of such a deflection monitoring system is provided in U.S. Pat. No. 7,883,316, which describes a deflection monitoring system utilising a wireless communication network, operable to detect the position of various points along the length of the blade, and to determine blade bending from this information.

WO 2014 027032 suggests the use of external transceivers mounted at the root end of the wind turbine blade in communication with transceivers mounted at the tip end of the blade. Based on, for example, radio communication, measures the distance between the transceivers is measured. Positioning of the transceivers is optimized with respect to path loss between the devices.

US 2010/021298 discloses a wireless deflection monitoring system comprising a nacelle communication device.

WO 2009/143848 discloses an optical monitoring system.

However, it has been found that such wireless monitoring systems are vulnerable to various operational factors that may interfere with—and obscure the communication signal, for example, signal reflections, multipath effects, signal attenuation caused by passing through layers of different materials, etc., thereby reducing the precision and effectiveness of the monitoring system.

It is an object of the invention to provide an improved blade deflection monitoring system which is less susceptible to the above-described factors.

SUMMARY OF THE INVENTION

The invention relates to a wind turbine blade comprising an airfoil profile body having a pressure side and a suction side, and a leading edge and a trailing edge with a chord length extending there between, the blade having a tip end and a root end, the wind turbine blade being defined in a XYZ coordinate system having a X-axis parallel to the chord length in the direction from the trailing towards the leading edge, a Y-axis perpendicular to the X-axis and in the direction from the pressure side to the suction side and a Z-axis perpendicular to an XY plane and in the longitudinal direction of the blade from the root end to the tip end, the wind turbine blade further comprising:
  at least one tip communication device located towards said tip end,
  at least one root communication device located towards said root end, said at least one root communication device being in wireless radio communication with said at least one tip communication device via a wireless communication path, to monitor the distance between said at least one tip communication device and said at least one root communication device to determine a movement of said at least one tip communication device relative to said at least one root communication device indicative of a blade deflection, wherein
said at least one tip- and at least one root communication devices comprise antennas polarized substantially along the Y-axis of the XYZ coordinate system.

Through monitoring for changes in the distance between communications devices provided towards the root and tip ends of the blade, the deflection of the wind turbine blade can be determined. This information can then be used to provide for improved wind turbine control, e.g. in the event that a blade deflection may lead to a tower strike, emergency pitching of the wind turbine blade may be carried out.

It has been found that Y-axis polarization of the antennas comprised in the communication devices provides more precise estimations tip movement than other polarizations. This is surprising because polarization along, for example, the X-axis of the XYZ coordinate system would be expected to have several advantages by being perpendicular to the leading edge. Thus, excitation of both surface waves and space waves along the leading edge are expected to be best with X-axis polarization. Also, enhancement of space waves close to the leading edge surface would be expected to benefit from X-axis polarization.

It has surprisingly been found by the present inventors that Y-axis polarization enhances the quality of the received signal and therefor more precise and robust deflection estimation, despite the above expectations.

It has thus been found by the present inventors that in the YZ-plane, Y-axis polarization, besides resulting in strong signals, surprisingly also provides very clean signals without detrimental interference of, for example, induced surface waves.

For the XZ-plane, it was found that Y-axis polarization provides a stronger signal than X-axis polarization which is highly surprising.

Accordingly, Y-axis polarization allows for precise estimations of the distance between the tip- and root communication devices, indicative of blade deflection.

Since Y-axis polarization has experimentally been shown to be beneficial in both the YZ-plane and the XZ-plane, Y-axis polarization is also beneficial in all the planes resulting from rotating the YZ-plane (or the XZ-plane) around the Z-axis.

Y-axis polarization is particularly advantageous when applied in the YZ plane when rotated between +/−0 and 30 degrees around the Z-axis.

According to embodiments of the invention, the estimated distance between the tip- and root communication devices is within +/−2 cm of the true value. It has to be kept in mind that the distance between the tip- and root communication devices may be above 30 m, 40 m or more, depending on the overall length of the wind turbine blade.

The Time-Of-Flight (=TOF) of the signals sent from the at least one tip communication device to the at least one root communication device may be estimated, for example, by comparing the time difference of the signals rising edge foot between the transmitted and received signals. The TOF may be directly used to indicate the distance between the transmitting—and the receiving devices.

In an embodiment of the invention said at least one tip communication device is provided internally in the airfoil profile body.

Devices mounted externally on the blade near the tip are expected to negatively influence aerodynamics towards the tip end and very likely create noise during operation of the wind turbine which is highly undesirable, especially near people's homes.

Also, the external environment around the tip end of the blade may be highly erosive due to the high speeds of the tip through the air which imposes a risk of damaging the tip communication device if externally mounted. This damage could happen over time or suddenly in situation of harsh wind conditions which is exactly the situation, where the deflection measurement is needed the most to prevent tower strikes.

It has been found that by mounting the tip communication device(s) internally in the airfoil body, thereby protecting the device(s) from the external environment, still makes possible good determination of the tip position, when Y-axis polarization is used, and despite the obstacle in the form of the blade laminate structure obscures the line-of sight between tip communication- and root communication devices. Surprisingly, the penetration loss experienced when mounting the tip communication device(s) internally in the airfoil body will still allow for enough signal strength for sufficiently precise distance estimations, when Y-axis polarization is used.

Furthermore, the positioning of the root and tip devices on the blade itself ensures that the communication path between the devices is maintained, regardless of blade pitch or rotation, or turbine yaw movements. By providing the devices in the same pitching co-ordinate system, this allows for a considerable simplification of the calculations required for system operation, when compared with alternative systems having a first device mounted to a blade and a second device mounted to a rotor hub or to a turbine nacelle.

It should be noted that with an internally mounted tip communication device it turns out that the multipath components are much stronger when compared to an externally mounted device. This has been found to be manageable when using Y-axis polarization.

In an embodiment of the invention said wireless radio communication uses narrow time domain pulses.

In an embodiment of the invention said at least one tip communication device is transmitting narrow time-domain pulses from a pulse generator, and said at least one root communication device is receiving said narrow time-domain pulses.

The communication between the tip- and root devices may preferably be achieved using Ultra Wide Band (=UWB) radio signals. In an embodiment of the invention a UWB pulse signal is transmitted from the at least one tip communication device and received by the at least one root communication device. The distance between the tip- and root devices may then be determined by comparing the rising edges of a transmitted pulse and a corresponding received first pulse, based on the time-of-flight of the pulse. Trilateration and or triangulation may be used to determine the tip position.

Preferably, said at least one tip communication device and said at least one root communication device are ultra-wideband (UWB) location tracking and/or communication devices, and wherein said communication path is a UWB signal communication path.

UWB communication allows for a range or distance measurement to be performed between a transmitter and a receiver device, in a low-power application, minimizing the effects of outside interference.

It will be understood that said at least one tip communication device and/or said at least one root communication device is selected from one of the following: a receiver, a transmitter, a receiver-transmitter circuit, or a transceiver.

In an embodiment of the invention said at least one tip communication device is located between 0.5 and 5 m from the tip end of the airfoil profile body, preferably between 2-4 m form the tip end of the airfoil profile body.

Preferably, said at least one tip communication device is located towards the leading edge or trailing edge of said wind turbine blade. For example, the at least one tip communication device may be mounted internally in the blade body on the shear web facing the leading edge of the blade and close to the tip end of the blade.

The at least one tip communication device may also be mounted at a position between the trailing edge shear web and the leading edge shear web.

Alternatively or supplementary, a tip communication device may also be mounted at a position on the trailing edge shear web and facing the trailing edge.

Ideally, the at least one tip communication device should be located as close as possible to the tip to accurately assess the tip position and the actual deflection. In practice, this may not always be possible or desirable, for example because the space within the airfoil profile body becomes more and more limited towards the tip end, the tip communication device may be positioned somewhat away from the tip end, taking space considerations into account.

In an embodiment of the invention said at least one root communication device is arranged externally on the airfoil profile body.

Because the root portion of a wind turbine blade contributes very little or not at all to the aerodynamic performance of the blade due to its usually circular geometry, performance of the blade in terms of energy production is not affected significantly by placing the root communication device(s) externally on the airfoil profile body.

In a preferred embodiment, two root communication devices are mounted on brackets externally on the root section of the airfoil profile body.

In an embodiment of the invention the height H of the at least one root communication over the surface of the blade is between 0.2-2 m, preferably between 0.3-1.5 m.

It has been found that the height over the surface of the blade may be important for the strength of the received signal. It is desirable that the at least one root communication device is kept as close as possible to the blade surface to avoid noise from the device during rotation of the rotor of the wind turbine and to reduce exposure to the environment. When the antennas comprised in the tip- and root communications, respectively are polarized along the Y-axis, adequate signals may be received at the root communication device(s) even at comparatively low heights over the blade surface.

It will be understood that the devices may be provided at the blade leading or trailing edges, or adjacent the leading or trailing edge.

Preferably, the wind turbine blade comprises a first root communication device provided on a first bracket and a second root communication device provided on a second bracket, the first and second root communication devices provided towards the leading or trailing edge wherein said first root communication device is located on the pressure side of said leading or trailing edge and said second root communication device is located on the suction side of said leading or trailing edge.

By placing the root devices on either side of the leading or trailing edge, the root devices can be provided at definable positions which allow for trilateration and/or triangulation distance or location measurements.

Preferably, said at least one root communication device is operable to determine the location of said at least one tip communication device using trilateration. Additionally or alternatively, said at least one root communication device is operable to determine the location of said at least one tip communication device using triangulation.

In an embodiment of the invention said determining a movement of said at least one tip communication device relative to said at least one root communication device indicative of a blade deflection is based on detecting a rising edge of a received first pulse and estimating the time-of-flight of said narrow time domain pulses.

In an embodiment of the invention said wind turbine blade comprises two root communication devices mounted on the blade.

In order to robustly estimate the movement of the blade tip in the whole range of no deflection to maximum allowable deflection, it may be preferred to apply two root communication devices.

In an embodiment of the invention said wind turbine blade comprises a first root communication device arranged substantially in an YZ-plane of the blade and a second root communication device arranged substantially in a XZ-plane of the blade.

Additionally or alternatively, the wind turbine blade further comprises a controller, said controller operable to control a signal transmitted along said wireless communication path between said at least one tip communication device and said at least one root communication device, wherein
    said controller is further operable to adjust the signal gain of said signal based on at least one of the following: a measured blade deflection level, a predicted blade deflection level, a signal strength level of a signal received via said communication path.

Such an adaptive control of the communications link between the root and tip devices provides for improved system operation, and reduced operational power requirements due to optimized signal levels.

The invention also pertains to a wind turbine having at least one wind turbine blade as described herein.

Such wind turbine may be controlled to avoid tower strikes based on the position data provided by the blade deflection monitoring system.

In an embodiment of the invention the wind turbine further comprises a pitch control system operable to adjust the pitch of at least one wind turbine blade of said wind turbine, wherein the input to said pitch control system is at least partially based on the determined movement of said at least one tip communication device relative to said at least one root communication device indicative of a blade deflection.

The invention also pertains to a blade deflection monitoring system for installation on a wind turbine blade, the wind turbine blade comprising an airfoil profile body having a pressure side and a suction side, and a leading edge and a trailing edge with a chord length extending there between, the blade having a tip end and a root end, the wind turbine blade being defined in a XYZ coordinate system having a X-axis parallel to the chord length in the direction from the trailing towards the leading edge, a Y-axis perpendicular to the X-axis and in the direction from the pressure side to the suction side and a Z-axis perpendicular to an XY plane and in the longitudinal direction of the blade from the root end to the tip end, the blade deflection monitoring system comprising:
    at least one tip communication device located towards said tip end,
    at least one root communication device located towards said root end,
said at least one root communication device being in wireless radio communication with said at least one tip communication device via a wireless communication path, to monitor the distance between said at least one tip communication device and said at least one root communication device to determine a movement of said at least one tip communication device relative to said at least one root communication device indicative of a blade deflection,
wherein said at least one tip- and at least one root communication devices comprise antennas polarized substantially along the Y-axis of the XYZ coordinate system.

In an embodiment of the invention the system further comprises a pulse generator coaxially connected to said at least one tip communication device.

The invention also pertains to a method of monitoring the deflection of a wind turbine blade comprising an airfoil profile body having a pressure side and a suction side, and a leading edge and a trailing edge with a chord length extending there between, the blade having a tip end and a root end, the wind turbine blade being defined in a XYZ coordinate system having a X-axis parallel to the chord length in the direction from the trailing towards the leading edge, a Y-axis perpendicular to the X-axis and in the direction from the pressure side to the suction side and a Z-axis perpendicular to an XY plane and in the longitudinal direction of the blade from the root end to the tip end, at least one tip communication device located towards said tip end,
    at least one root communication device located towards said root end, the method comprising the steps of:
    establishing wireless communication via a wireless communication path between said at least one tip communication device and said at least one root communication device by sending a pulsed radio signal from said at least one tip communication device to said at least one root communication device, said at least one tip communication device comprising an antenna being polarized along the Y-axis of the XYZ coordinate system and said at least one root communication device comprising an antenna being polarized along the Y-axis of the XYZ coordinate system,
    detecting a rising edge of a first pulse of said radio signal received at the root communication device,
    estimating the time-of-flight of said pulsed radio signals based on said detecting a rising edge,
    estimating the deflection of the tip end of the wind turbine blade based on said time-of-flight estimation.

It will be understood that the wind turbine may be provided with a supplementary safety system, which is operable to ensure turbine safety, and prevent tower strikes, etc., in the event of failure of the blade deflection measurement system.

DESCRIPTION OF THE INVENTION

Embodiments of the invention will now be described, by way of example only, with reference to the accompanying drawings, in which.

It will be understood that the attached drawings are illustrative only, and are not drawn to scale.

Figure 1:
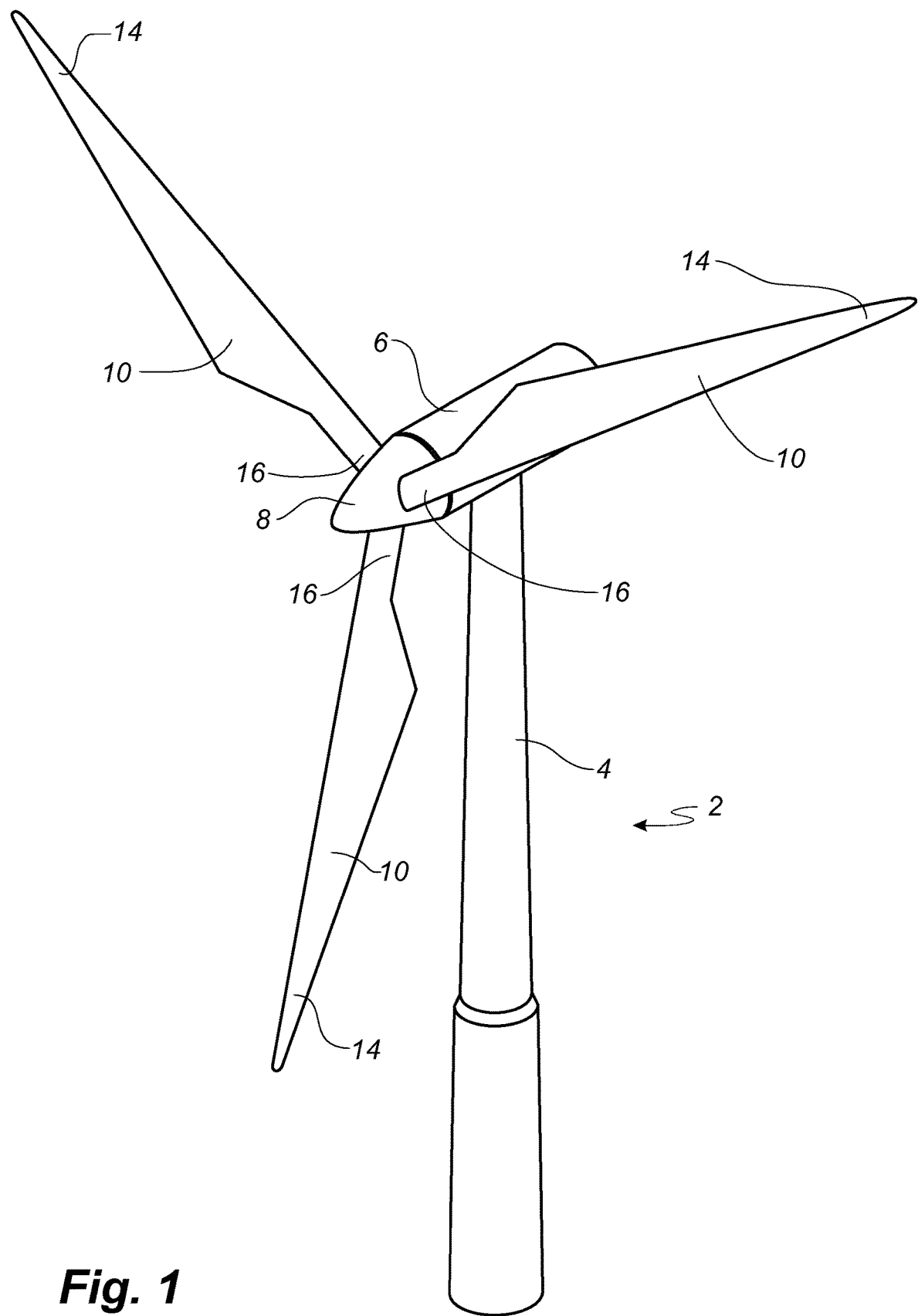
FIG. 1 shows a wind turbine.

FIG. 1 illustrates a conventional modern upwind wind turbine 2 according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
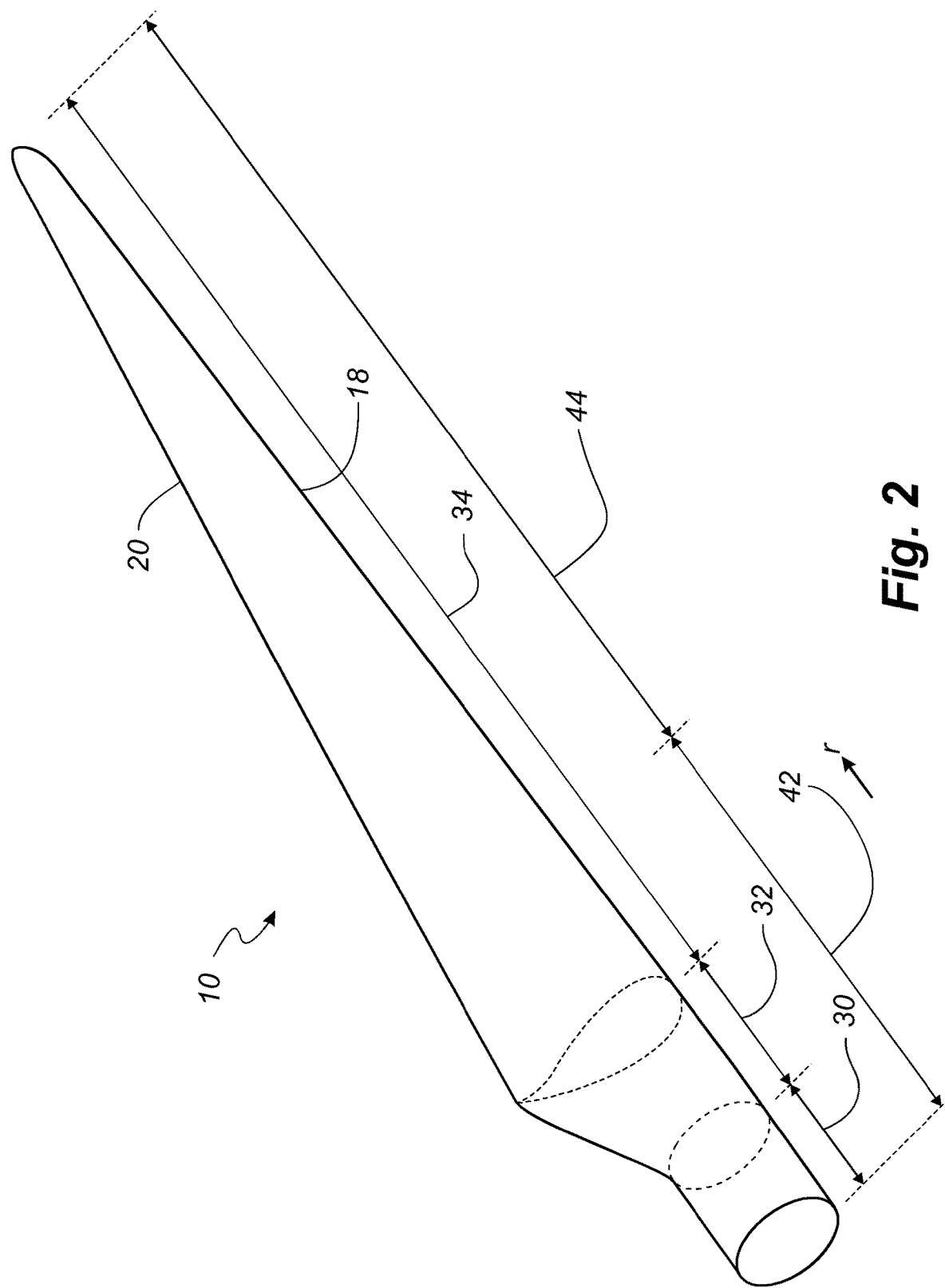
FIG. 2 shows a schematic view of a wind turbine blade.

FIG. 2 shows a schematic view of a first embodiment of a wind turbine blade 10 which may be used according to an embodiment of the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

Figure 3:
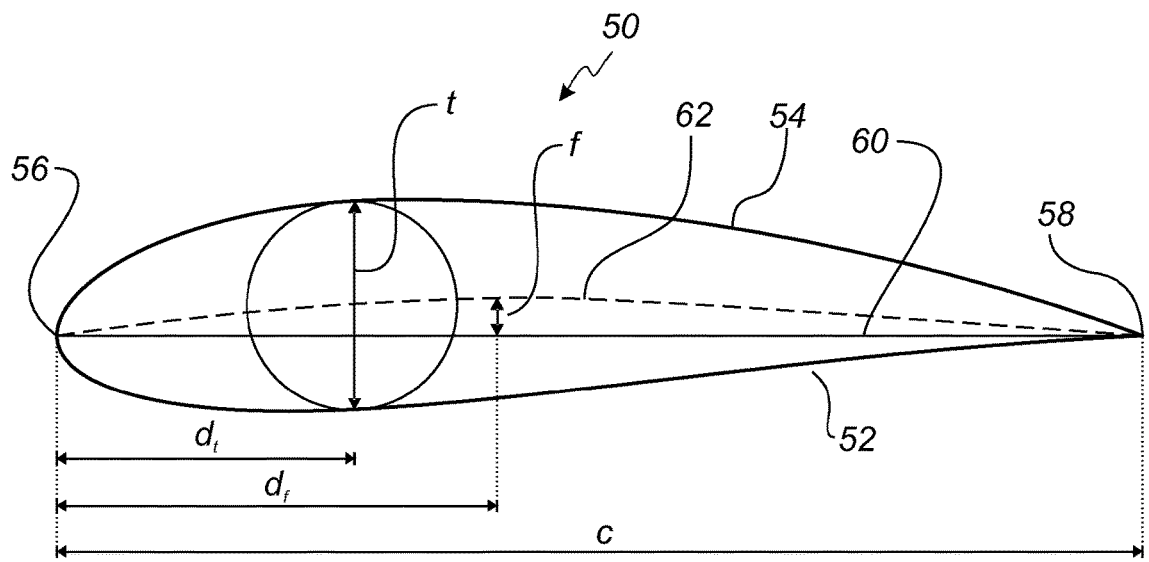
FIG. 3 shows a schematic view of an airfoil profile of the blade of FIG. 2.

FIG. 3 shows a schematic view of an airfoil profile 50 of a typical blade of a wind turbine depicted with the various parameters which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position df of the maximum camber f, the maximum airfoil thickness t, which is the largest diameter of the inscribed circles along the median camber line 62, the position dt of the maximum thickness t, and a nose radius (not shown). These parameters are typically defined as ratios to the chord length c.

Wind turbine blades are generally formed from fibre-reinforced plastics material, i.e. glass fibres and/or carbon fibres which are arranged in a mould and cured with a resin to form a solid structure. Modern wind turbine blades can often be in excess of 30-40 metres in length, having blade root diameters of several metres.

Figure 4:
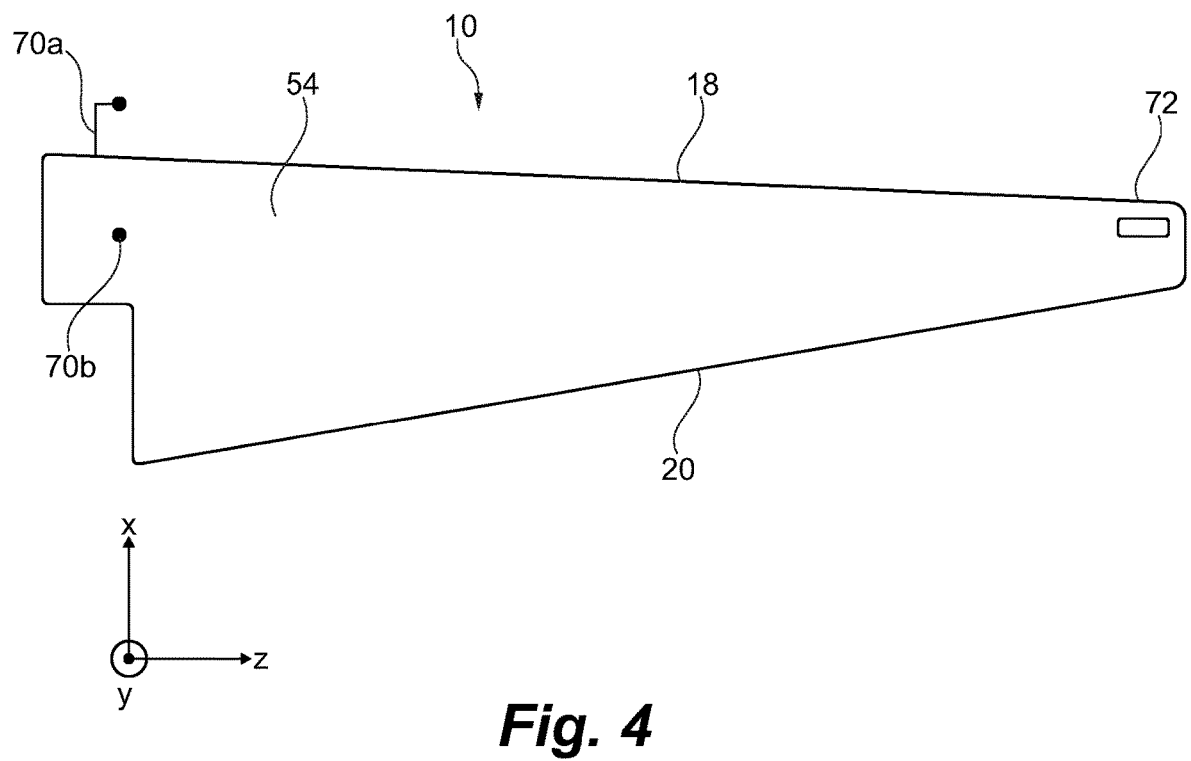
FIG. 4 illustrates a wind turbine blade having a blade deflection monitoring system according to an embodiment of the invention.

With reference to FIG. 4, a wind turbine blade 10 is shown having a blade deflection monitoring system according to an embodiment of the invention. The deflection monitoring system comprises at least one root end wireless communication device 70 arranged at the exterior side of the hollow blade body at the root end and at least one tip end wireless communication device 72 arranged in the interior of the blade body in the tip region. The tip end wireless communication device may for example be mounted on a leading edge web in a typical blade having a box spar design with a leading edge—and trailing edge shear web. The respective wireless devices 70, 72 are operable to establish a communication link, and perform a range measurement between the different devices 70, 72. The blade 10 may further comprise a controller (not shown) which is operable to receive the range measurement details from the communication devices in order to determine the measured blade deflection.

In one aspect, the root and tip devices 70,72 are located at the leading edge 18 of the wind turbine blade 10. As a communication device mounted on the leading or trailing edge 18,20 is less susceptible to flapwise bending than a device mounted on the pressure or suction sides of the blade 10, and as the magnitude of the edgewise bending of the blade 10 is understood to be significantly less than that of flapwise bending, this provides for improved reliability of the communications link between the root and tip devices 70,72, as the communications path between devices is less likely to be disturbed by bending of the blade 10.

Additionally or alternatively, the root and tip devices 70,72 may be mounted at the blade trailing edge 20.

In the embodiment on FIG. 4, two root communication devices 70 are shown, one device 70a located at the leading edge 18 of the blade 10 and one device 70b located at the suction side 54 of the blade 10. The tip communication device 72 is indicated being arranged inside the blade body close to the tip and towards the leading edge 18.

Figure 5:
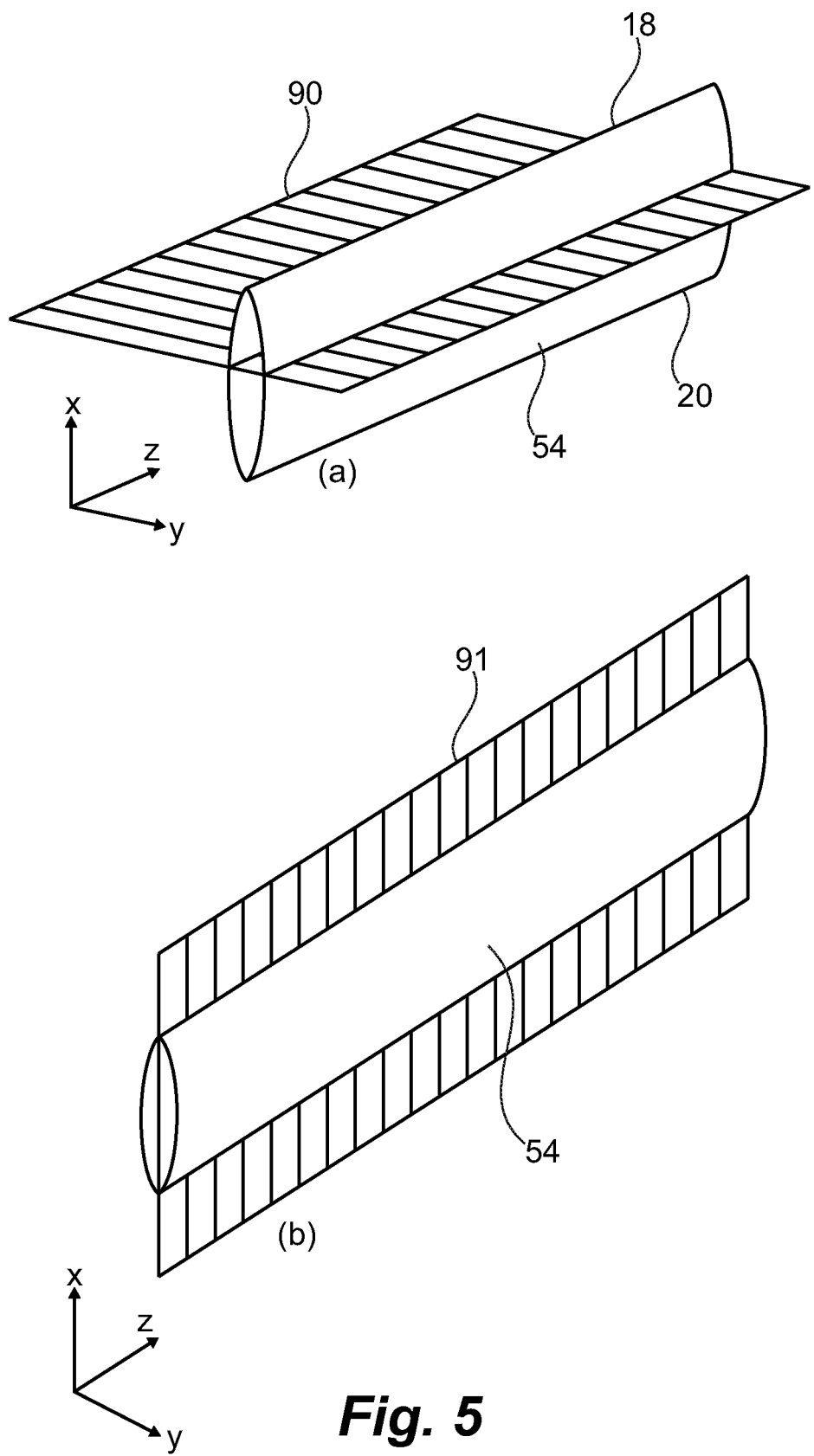
FIG. 5 is a schematic view of the YZ plane (a) and the XZ plane (b) of a wind turbine blade according to the invention.

FIG. 5 (a) illustrates the YZ plane 90 of the XYZ-coordinate system. This plane represents a plane in which the at least one root communication device may be placed, and polarization along the Y-axis provides superior signal quality, when compared to other polarizations and in particular, X-axis polarization.

The YZ plane can be seen to be substantially perpendicular to the suction side 54 of the blade and substantially parallel to the leading edge 18.

FIG. 5 (b) illustrates the XZ plane 91 of the XYZ-coordinate system. This plane is substantially perpendicular to the leading edge and represents another plane in which the at least one root communication device may be placed. Also in this case, polarization along the Y-axis provides superior signal quality, when compared to other polarizations and in particular, X-axis polarization.

Accordingly, placement of the at least one root communication device may advantageously be in one or both of the illustrated planes but also in planes corresponding to the illustrated planes when rotated around the Z-axis. In all cases, Y-axis polarization has been found to provide superior signal quality.

This indicates that the exact positioning of the root communication devices on the blade root surface may not be too critical when Y-axis polarization is used.

In case of large scale bodies such as a wind turbine blade, polarization perpendicular to the material surface has been found to excite both surface waves along the outer surface of the body and space waves.

To perform, for example, a distance measurement to assess the distance between the tip communication device and the root communication device an Ultra-Wideband (=UWB) Pulse signal may be used, the time-of-flight of which being indicative of the distance.

The tip communication device comprising a tip antenna, the tip antenna polarization has been found to significantly influence the received signal strength at the antennas comprised in the root communication device of the wave front with respect to the first UWB pulse rising edge. Since, for a precise measurement, not only the pulse signal strength is relevant but also the time of arrival of the pulse signal, comprising surface wave—and space wave components, needs to be well resolved.

It has surprisingly been found that polarization of the tip communication device in the along the Y-axis of the coordinate system (Y-axis polarization) allows for more precise distance estimation than X-axis polarization due to a better signal-to-noise ratio, good separation of surface wave components and the first pulse rising edge space wave component used in the measurement, and a stronger wave front close to the blade surface. It would have been expected that X-axis polarization would produce the strongest wave front close to the blade surface.

Figure 6:
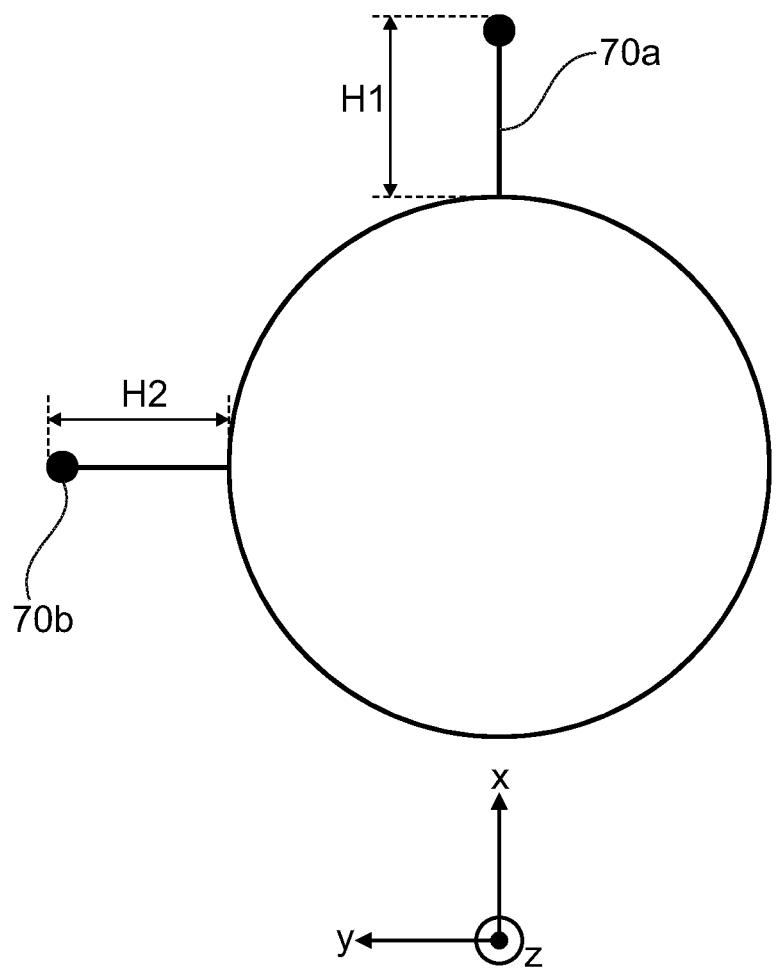
FIG. 6 is a schematic view of the root end of a wind turbine blade according to an embodiment of the invention.

FIG. 6 schematically illustrates an arrangement of two root communication devices (70a, 70b) according to an embodiment of the invention. The root communication devices comprise two antennas, a first antenna 70a placed substantially in the XZ-plane and a second antenna 70b placed substantially in the YZ-plane. The devices are located at the substantially circular root end of the blade. The root devices 70a, 70b may be provided on the distal ends of brackets.

The deflection of the blade in the +Y-direction may vary from no deflection, where the blade may be pre-bent in the −Y-direction to 100% deflection. This means that the position of the tip communication device with respect to the root communication device will vary from a situation, where the blade is pre-bent (no deflection), via a situation where the blade is more or less straight (for example 36% deflection, depending on how much the blade is pre-bent) to greater deflections where the blade tip moves in the +Y-direction under even more wind pressure, the actual deflection depending on, among other factors, the wind speed.

The heights H1, H2 of the root communication devices above the blade surface may be varied and used to optimize the quality of the signal received from the tip communication device.

It has been found that the wave front close to the surface of the blade is highly important for the measurement and for keeping H1 and H2 within certain boundaries to, for example, minimise noise from the root devices. In this respect, Y-axis polarization provides distinct advantages, contrary to expectations. Y-axis polarization maximizes the wave front strength at a low angle along the blade when compared to X-axis polarization.

It should be noted that the root communication devices may be arranged in other configurations within the scope of the invention. The test results obtained for the configuration shown for the embodiment of FIGS. 4 and 6 illustrate the general principle that tip-antenna Y-axis polarization has distinct advantages over X-axis polarization, both in the YZ plane and in the XZ plane because the signal received at the root antenna(s) allows for a more robust assessment of the movement of the tip with respect to the root in case of Y-axis polarization.

FIGS. 7a, 7b, 7c, 7d, 7e, 7f, 7g, 7h, 7i, 7j, 7k, 7m, 7n and 7p show test results comparing signals received at the root communication devices for different polarizations of the tip communication device. In all figures, the x-axis expresses the time in nano-seconds and the y-axis expresses the pulse amplitude normalized by the amplitude of the first pulse received at root antenna 70b at 100% deflection and with Y-axis polarization (FIG. 7m).

The data in FIG. 7 were obtained in a test setup comprising a 37.3 m long wind turbine blade, two root communication devices 70a, 70b being arranged as depicted in FIG. 6 with H1=1 m and H2=0.4 m. A tip communication device was mounted within the blade body close to the leading edge and a few meters from the tip.

Deflection along the Y-axis of the XYZ coordinate system was performed with a clamp and wire system with the blade root fixed.

Pre-bending at 0% deflection was about −1 m on the Y-axis of the XYZ coordinate system while 100% deflection was taken at +1.5 m.

Signals used in the test were Gaussian UWB-pulses (3.1-5.3 GHz) transmitted form the tip device to the root devices. The distance between the tip- and root devices, respectively, was estimated via Time-Of-Flight (=TOF) calculations by comparing the input (or transmitted) and the output (or received) first pulse rising edges.

Figure 7A:
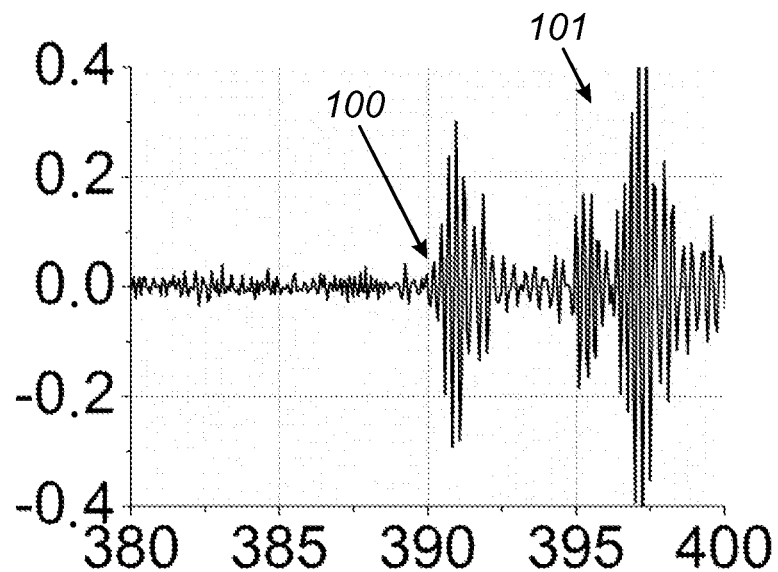
FIGS. 7a, 7b, 7c, 7d, 7e, 7f, 7g, 7h, 7i, 7j, 7k, 7m, 7n and 7p show a presentation of a received pulse under different deflection conditions and with different polarizations of the tip communication device.

FIG. 7a shows the received signal at root antenna 70a and at 0% deflection. The rising edge 100 of the pulse is clean and strong in this case and strong multipath effects 101 are seen.

Figure 7B:
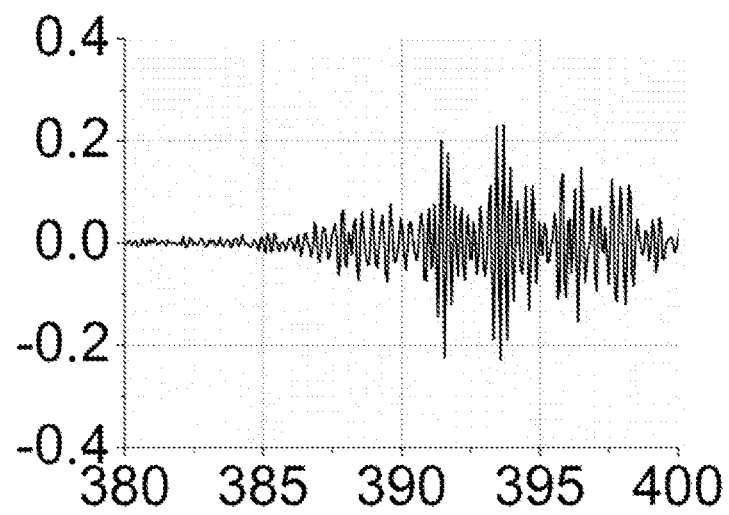

FIG. 7b shows the received signal at antenna 70b at 0% deflection. The rising edge is significantly weaker than for antenna 70a and strong multipath interference is seen.

FIGS. 7a and b are obtained with Y-axis polarization of the antennas.

Figure 7C:
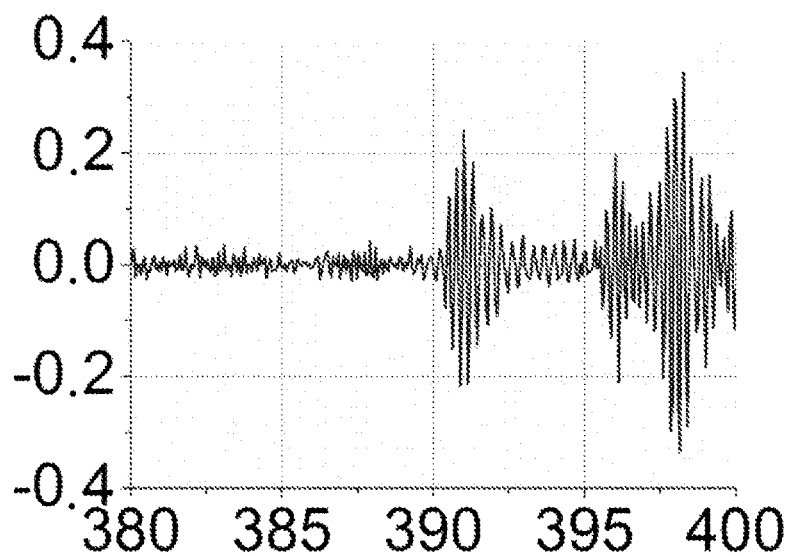
Figure 7D:
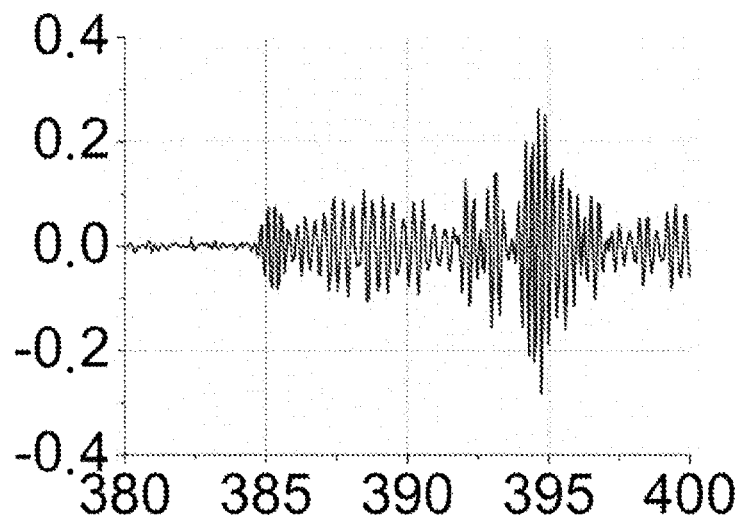

FIGS. 7c and 7d show the received signals for antennas 70a and 70b, respectively, with Y-axis polarization and at 36% deflection.

Figure 7E:
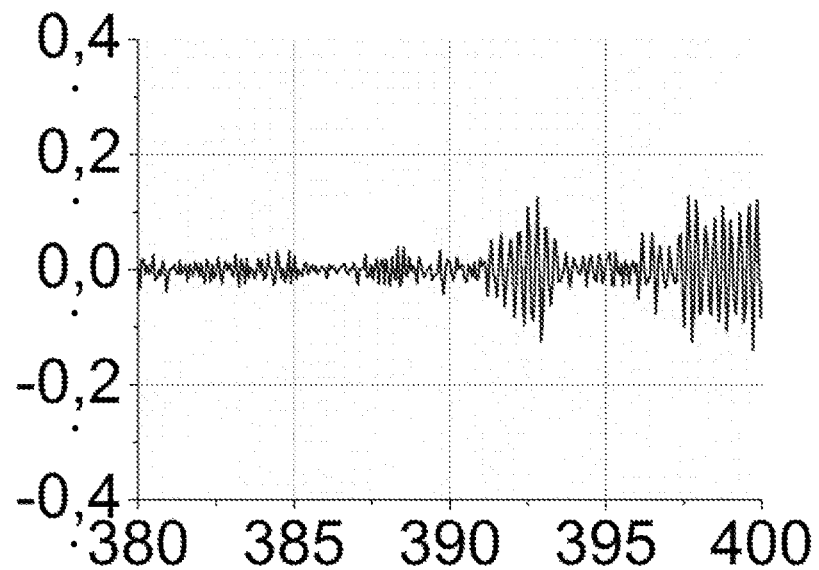
Figure 7F:
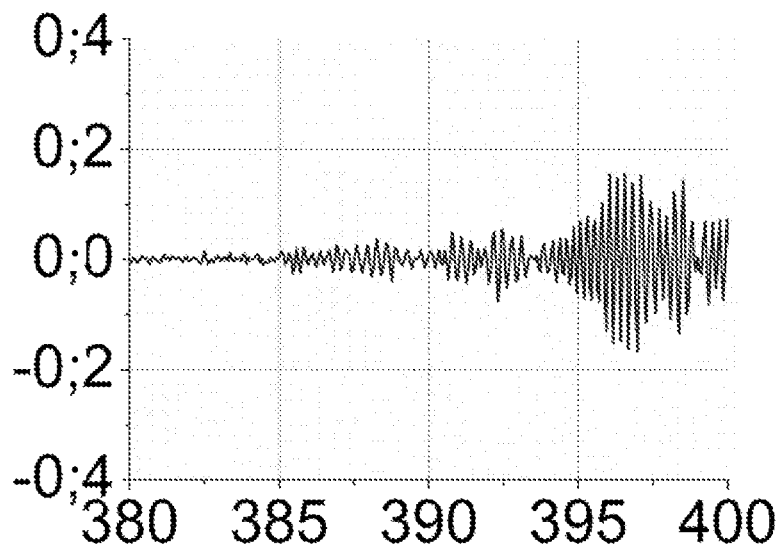

FIGS. 7e and 7f show the received signals for antennas 70a and 70b, respectively, with X-axis polarization and at 36% deflection.

By comparing the signals especially with respect to the strength of the rising edge it becomes clear that in the case of 36% deflection, substantially corresponding to a straight blade, polarization of the tip device in the YZ plane or Y-axis polarization provides stronger and more distinct received signals at both root devices.

Figure 7G:
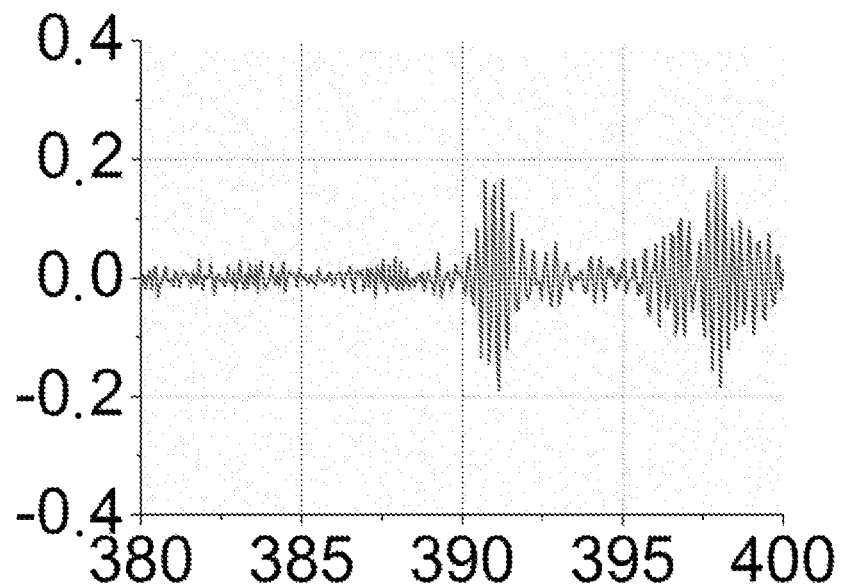
Figure 7H:
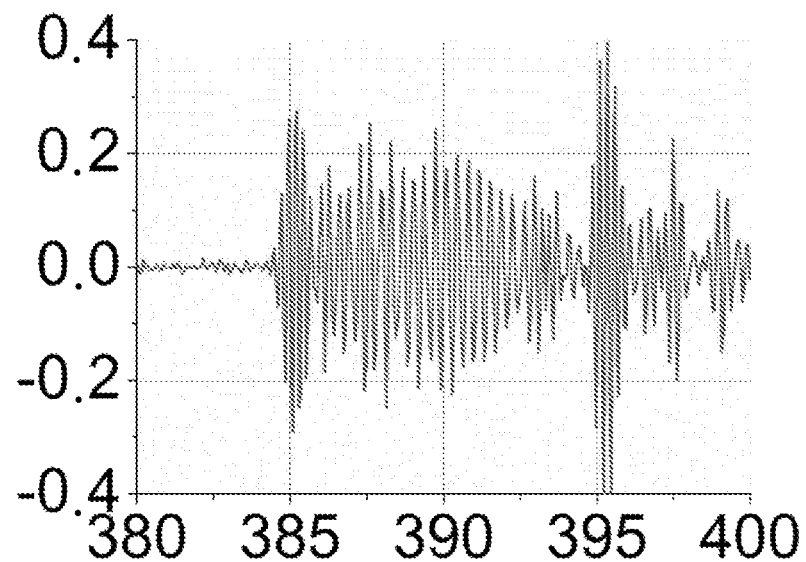

FIGS. 7g and 7h show the received signals for antennas 70a and 70b, respectively, with Y-axis polarization and at 60% deflection.

Figure 7I:
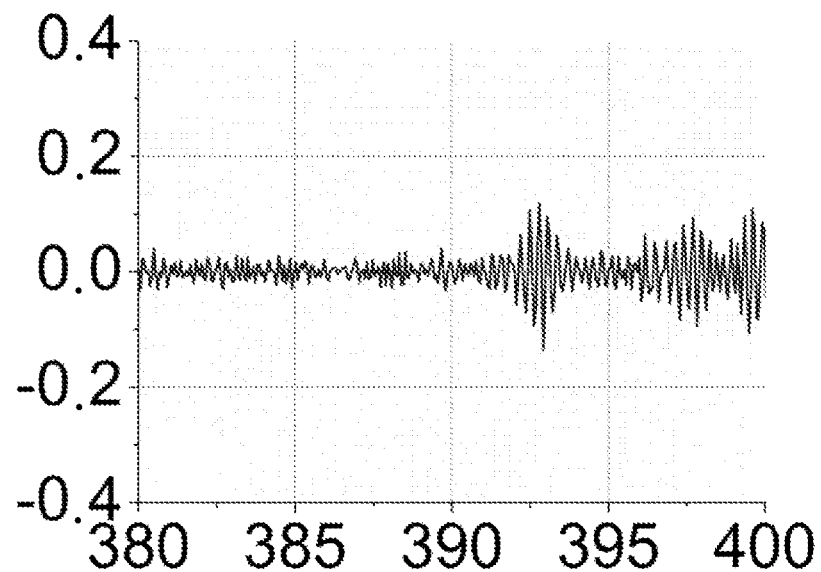
Figure 7J:
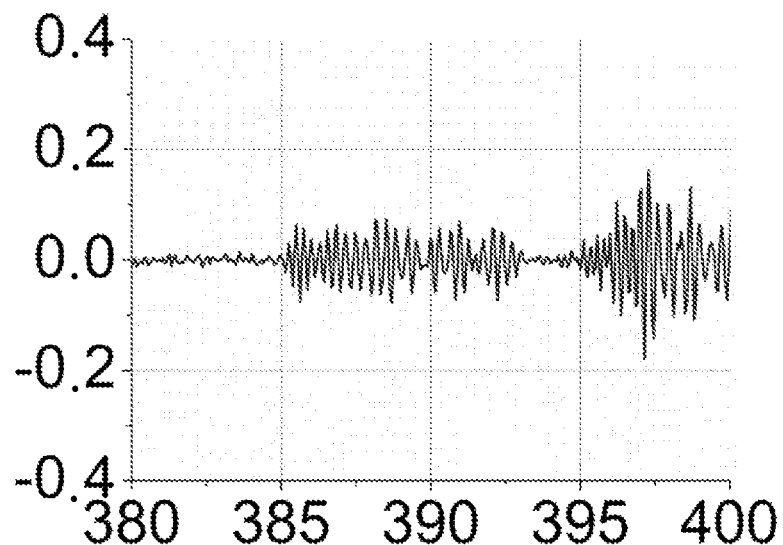

FIGS. 7i and 7j show the received signals for antennas 70a and 70b, respectively, with X-axis polarization and at 60% deflection As was the case at 36% deflection, again the received signals at both antenna 70a and 70b are stronger and cleaner when Y-axis polarization is used. It is also seen that multipath effects are strong for both X-axis and Y-axis polarizations.

Figure 7K:
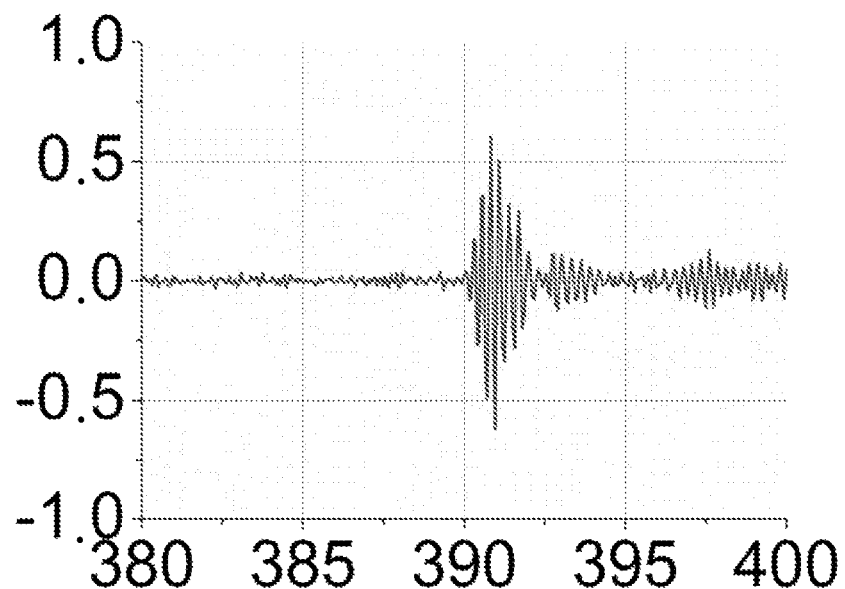
Figure 7M:
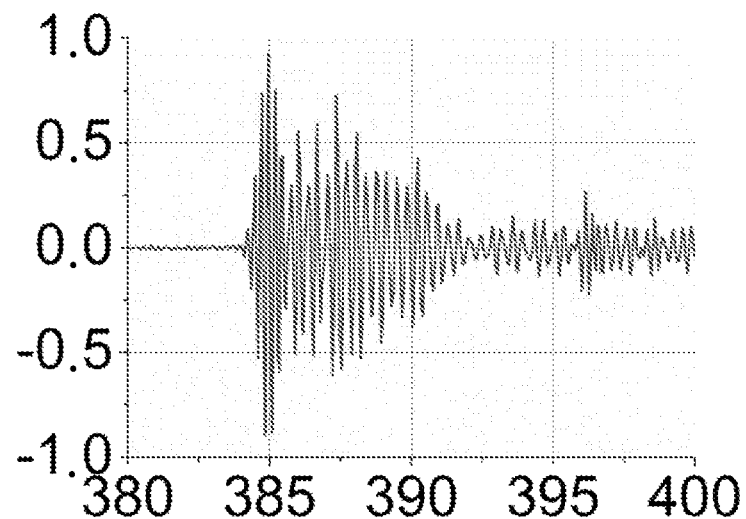

FIGS. 7k and 7m show the received signals for antennas 70a and 70b, respectively, with Y-axis polarization and at 100% deflection.

Figure 7N:
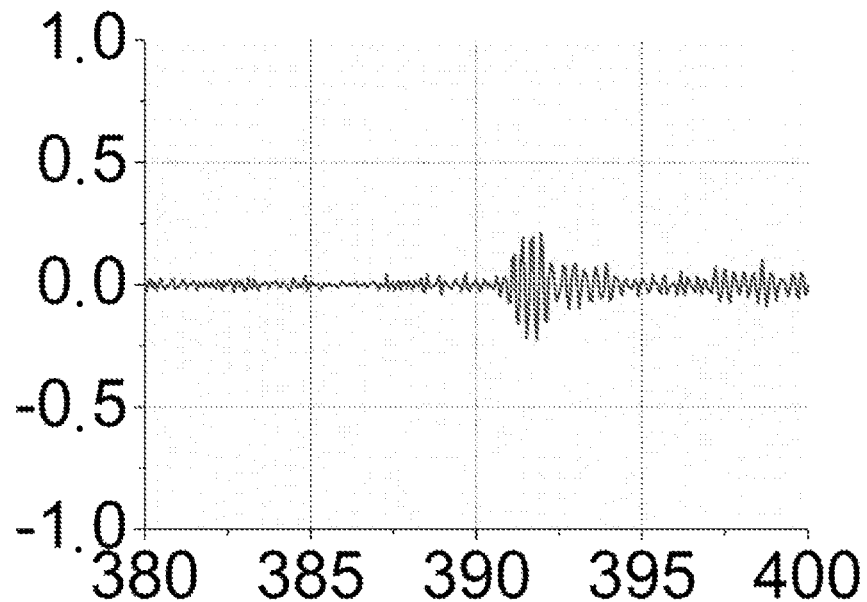
Figure 7P:
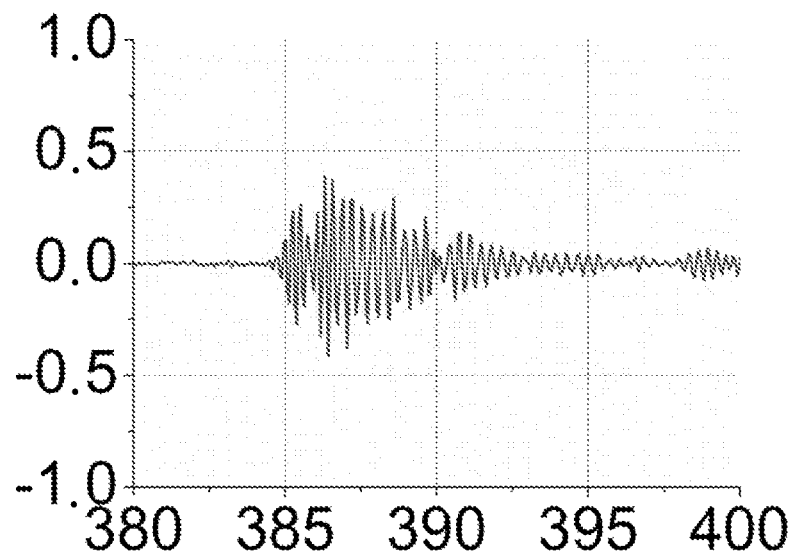

FIGS. 7n and 7p show the received signals for antennas 70a and 70b, respectively, with X-axis polarization and at 100% deflection As was the case at 36% and 60% deflection, again the received signals at both antenna 70a and 70b are stronger and cleaner when Y-axis polarization is used.

It may be concluded that the data shown in FIGS. 7a, 7b, 7c, 7d, 7e, 7f, 7g, 7h, 7i, 7j, 7k, 7m, 7n and 7p clearly indicate that the first pulse amplitudes of the received pulse at both root devices 70a and 10b are significantly stronger with Y-axis polarization than with X-axis polarization.

Furthermore, in most situations the multipath amplitudes with X-axis polarization are often comparable with the rising edge amplitudes. This in combination with the overall weaker received signals with X-axis polarization increases the risk of misinterpretation of the signal by the algorithm used to perform the calculations involved in the distance estimation.

This means that when the first pulse rising edge is used to estimate the tip to root distance in a TOF calculation, it is clearly beneficial to polarize the tip antenna and the root antennas in the Y-axis direction.

X-axis polarization or other polarizations may also provide useful signals, but according to the invention, it is significantly better to use Y-axis polarization.

It is clear from the above that it may be sufficient for the invention to work to have at least one root communication device.

For example, the root antenna 70a arranged close to the leading edge and with Y-axis polarization, receives first pulses with the best signal-to-noise ratio in the range of 0-36% deflection when compared to root antenna 70b. For larger deflections and up to 100% deflection, corresponding to the maximum allowed deflection for the blade, the root antenna 70b arranged towards at suction side of the blade receives first pulses with the best signal-to-noise ratio when compared to root antenna 70a.

Accordingly, to safely prevent the blade tip from striking the tower it may suffice to have one root communication device arranged, for example, towards the suction side blade, which provides the best data at severe deflection. Even to monitor the full range of possible deflections may be possible with only one root communication device, since the signal quality received by root communication device 70a is sufficient for a good estimate of the tip position over the full range if Y-axis polarization is applied.

As the deflection characteristics of the wind turbine blade 10 may be determined from the details of the blade construction, and additionally as each wind turbine blade 10 has a maximum certified deflection level defining an allowable range of blade deflection shapes, it is possible to configure the arrangement of the blade deflection monitoring system of the invention based on the wind turbine blade in question.

By using two root communication devices, an excellent and robust assessment of the whole range of possible tip positions may be made when using Y-axis polarization.

It may be advantageous to suppress signal reflections from the external surface of the blade. In particular when the blade is deflected or in case of a non-deflected pre-bent blade, signals from the tip communication device may be reflected from the blade and obscure the signals received by the root communication device.

Thus, the external blade surface may be made less reflective at positions close to the line of sight between the root- and tip devices through surface treatment in the form of radio wave absorbing coatings or otherwise providing the surface with a scattering effect, for example by roughening the surface and/or provide small indentions and protrusions on the surface.

It may be advantageous to suppress guided waves inside the blade body by placing radio wave absorbing material in selected spots within the blade body and within the wireless communication path.

In this context the line of sight is to be understood as the direct line between tip a tip communication device and a root communication device passing through any obstacles located in the way, for example the laminate of the airfoil shell body.

Preferably, the communications link is using Ultra Wide Band (UWB) technology, but it will be understood that any other suitable radio-based communication and ranging technology may be used.

It will be understood that the blade deflection monitoring system of the invention may comprise any suitable control system for the efficient and effective operation of the system.

The invention provides a system to ensure accurate monitoring of blade deflection, having improved signal quality. The tip communication device is provided inside the hollow blade body, thereby protecting the device from harsh outdoor environment and eliminating any noise issues that may arise as a consequence of arranging such communication device on the exterior side of the blade at the tip end of the blade. The tip communication device is polarized along the Y-axis of the XYZ coordinate system (Y-axis polarization).

As a result of this configuration, the deflection monitoring system has relatively low power requirements, and provides improved reliability and signal quality compared to prior art wireless deflection monitoring systems.

The invention is not limited to the embodiments described herein, and may be modified or adapted without departing from the scope of the present invention.

The invention claimed is:

1. A wind turbine blade (10) comprising an airfoil profile body (50) having a pressure side (52) and a suction side (54), and a leading edge (18) and a trailing edge (20) with a chord length extending therebetween, the wind turbine blade (10) having a tip end (14) and a root end (16), the wind turbine blade (10) being defined in a XYZ coordinate system having a X-axis parallel to the chord length in a direction from the trailing edge (20) towards the leading edge (18), a Y-axis perpendicular to the X-axis and in a direction from the pressure side (52) to the suction side (54) and a Z-axis perpendicular to an XY plane and in a longitudinal direction of the wind turbine blade (10) from the root end (16) to the tip end (14), the wind turbine blade (10) further comprising:
- at least one tip communication device (72) located towards said tip end (14), and
- at least one root communication device (70) located towards said root end (16), said at least one root communication device (70) being in wireless radio communication with said at least one tip communication device (72) via a wireless communication path to monitor a distance between said at least one tip communication device (72) and said at least one root communication device (70) to determine a movement of said at least one tip communication device (72) relative to said at least one root communication device (70) indicative of a blade deflection, wherein said at least one tip communication device (72) and said at least one root communication device (70) comprise antennas polarized substantially along the Y-axis of the XYZ coordinate system.

2. The wind turbine blade according to claim 1, wherein said at least one tip communication device is provided internally in the airfoil profile body.

3. The wind turbine blade according to claim 1, wherein said wireless radio communication uses narrow time domain pulses.

4. The wind turbine blade according to claim 1, wherein said at least one tip communication device transmits narrow time-domain pulses from a pulse generator, and said at least one root communication device receives said narrow time-domain pulses.

5. The wind turbine blade according to claim 2, wherein said at least one tip communication device is located between 0.5 and 5 m from the tip end of the airfoil profile body.

6. The wind turbine blade according to claim 5, wherein said at least one tip communication device is located between 2 and 4 m from the tip end of the airfoil profile body.

7. The wind turbine blade according to claim 1, wherein said at least one root communication device is arranged externally on the airfoil profile body.

8. The wind turbine blade according to claim 7, wherein a height H of the at least one root communication device over a surface of the wind turbine blade (10) is between 0.2-2 m.

9. The wind turbine blade according to any of the claim 8, wherein the height H of the at least one root communication device over the surface of the wind turbine blade is between 0.3-1.5 m.

10. The wind turbine blade according to claim 3, wherein said determining of the movement of said at least one tip communication device relative to said at least one root communication device indicative of the blade deflection is based on detecting a rising edge of a received first pulse and estimating a time-of-flight of said narrow time domain pulses.

11. The wind turbine blade according to claim 1, wherein said wind turbine blade comprises two root communication devices mounted on the wind turbine blade (10).

12. The wind turbine blade according to claim 11, wherein said wind turbine blade comprises a first root communication device arranged substantially in a YZ plane of the wind turbine blade (10) and a second root communication device arranged substantially in a XZ-plane of the wind turbine blade (10).

13. A wind turbine having at least one wind turbine blade as claimed in claim 1.

14. The wind turbine as claimed in claim 13, further comprising a pitch control system operable to adjust a pitch of the at least one wind turbine blade of said wind turbine, wherein an input to said pitch control system is at least partially based on the determined movement of said at least one tip communication device relative to said at least one root communication device indicative of the blade deflection.

15. A blade deflection monitoring system for installation on a wind turbine blade, the wind turbine blade comprising an airfoil profile body having a pressure side and a suction side, and a leading edge and a trailing edge with a chord length extending therebetween, the wind turbine blade having a tip end and a root end, the wind turbine blade being defined in a XYZ coordinate system having a X-axis parallel to the chord length in a direction from the trailing edges towards the leading edge, a Y-axis perpendicular to the X-axis and in a direction from the pressure side to the suction side and a Z-axis perpendicular to an XY plane and in a longitudinal direction of the wind turbine blade from the root end to the tip end, the blade deflection monitoring system comprising:
- at least one tip communication device located towards said tip end, and
- at least one root communication device located towards said root end, said at least one root communication device being in wireless radio communication with said at least one tip communication device via a wireless communication path to monitor a distance between said at least one tip communication device and said at least one root communication device to determine a movement of said at least one tip communication device relative to said at least one root communication device indicative of a blade deflection, wherein said at least one tip communication device and said at least one root communication device comprise antennas polarized substantially along the Y-axis of the XYZ coordinate system.

16. The blade deflection monitoring system according to claim 15, wherein the system further comprises a pulse generator coaxially connected to said at least one tip communication device.

17. A method of monitoring the deflection of a wind turbine blade comprising an airfoil profile body having a pressure side and a suction side, and a leading edge and a trailing edge with a chord length extending therebetween, the wind turbine blade having a tip end and a root end, the wind turbine blade being defined in a XYZ coordinate system having a X-axis parallel to the chord length in a direction from the trailing edge towards the leading edge, a Y-axis perpendicular to the X-axis and in a direction from the pressure side to the suction side and a Z-axis perpendicular to an XY plane and in a longitudinal direction of the wind turbine blade from the root end to the tip end, at least one tip communication device located towards said tip end,
- at least one root communication device located towards said root end, the method comprising the steps of:
- establishing wireless communication via a wireless communication path between said at least one tip communication device and said at least one root communication device by sending a pulsed radio signal from said at least one tip communication device to said at least one root communication device, said at least one tip communication device comprising an antenna polarized along the Y-axis of the XYZ coordinate system and said at least one root communication device comprising an antenna being polarized along the Y-axis of the XYZ coordinate system, detecting a rising edge of a first pulse of said pulsed radio signal received at the at least one root communication device, estimating a time-of-flight of said pulsed radio signal based on said detecting the rising edge, and estimating a deflection of the tip end of the wind turbine blade based on said time-of-flight estimation.

* * * * *